United States Patent [19]

Gottlieb

[11] 4,027,944

[45] June 7, 1977

[54] ILLUMINATED SYSTEM FOR VERTICAL FLUORESCENT MICROSCOPY

[75] Inventor: Nathan Gottlieb, Kenmore, N.Y.

[73] Assignee: American Optical Corporation, Southbridge, Mass.

[22] Filed: Feb. 9, 1976

[21] Appl. No.: 656,765

[52] U.S. Cl. .............................. 350/91; 240/2 MA; 350/189
[51] Int. Cl.² ........................................ G02B 21/06
[58] Field of Search ................... 350/91; 240/2 MA

[56] References Cited

UNITED STATES PATENTS

| 1,891,348 | 12/1932 | Ellinger et al. | 350/91 |
| 1,951,636 | 3/1934 | Straubel | 240/2 MA |

FOREIGN PATENTS OR APPLICATIONS

| 1,007,516 | 5/1957 | Germany | 350/91 |

*Primary Examiner*—John K. Corbin
*Assistant Examiner*—Jon W. Henry
*Attorney, Agent, or Firm*—Alan H. Spencer; William C. Nealon; H. R. Berkenstock, Jr.

[57] ABSTRACT

A vertical illuminator for imaging a light source at the back aperture of a microscope objective for use in fluorescent microscopy has a light source, an axially-movable positive meniscus lens which has an aspheric convex surface, a positive biconvex lens, and a negative meniscus lens all in sequence and aligned along an optical axis with a beam splitter for introducing light from the source into a microscope observation system. The movable meniscus lens is used to focus an image of the light source at the objective back aperture.

3 Claims, 1 Drawing Figure

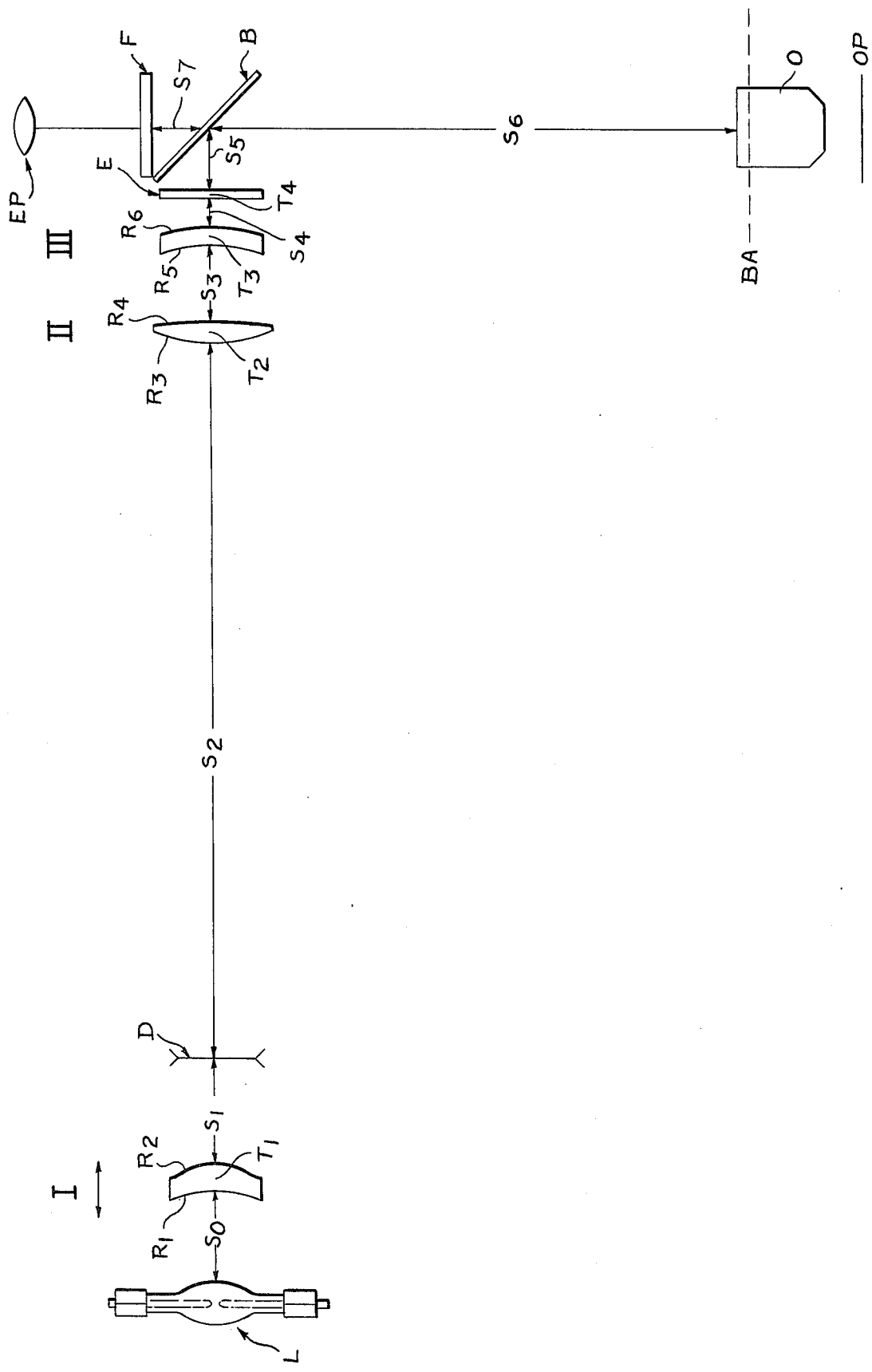

4,027,944

ILLUMINATED SYSTEM FOR VERTICAL FLUORESCENT MICROSCOPY

BACKGROUND OF THE INVENTION

The present invention relates to microscope illuminators and more particularly to vertical illuminators for use in fluorescent microscopy.

It is an object of the present invention to provide a vertical illuminating system for imaging the light source at the back aperture of a microscope objective.

It is further an object of the present invention to provide a vertical illumination system useful in fluorescent microscopy.

It is still further an object of the present invention to provide an illumination system having sufficient distance between the iris diaphragm and the following lens element to permit selective insertion of various filters, or other light-modifying elements.

BRIEF DESCRIPTION OF THE PRESENT INVENTION AND DRAWING

The illumination system of the present invention includes a light source, an axially-moveable positive meniscus lens, a positive biconvex lens and a negative meniscus lens in sequence and aligned along an optical axis with a beam splitter for introducing light from the source into the observation system of a microscope.

The drawing is an optical diagram of an illumination system according to the present invention.

DETAILED DESCRIPTION OF THE PRESENT INVENTION

Referring to the drawing, focusing lens I collects light from source L. Source L is preferably an arc light source but may be of the filament type. Focusing lens I directs the light through iris diaphragm D to the telephoto system of lenses II and III. The light is introduced into the optical system by beam splitter B through the microscope objective O and onto the surface under examination in plane OP. Reflection from the surface under examination directs the light back through objective O and beam splitter B to observation eyepiece EP. In fluorescent microscopy, a exciter filter E is normally positioned between lens III and beam splitter B. Also, a barrier filter is normally positioned between beam splitter B and eyepiece EP for fluorescent microscopy. Focus lens I is axially moveable to focus an image of source L at the back aperture BA of object O. The back aperture is generally selected as the most practical position for imaging source L because the position of the back focal plane varies from objective to objective. Generally, the back focal plane is near the back aperture and the amount of light which is transmitted through the objective to the surface under examination is dependent on the amount of light filling the back aperture of the objective. A secondary purpose of focusable lens I is to fill iris D with light in order to assure uniform illumination across the entire field of view.

Table I provides lens parameters and suggested positioning of other elements for the illumination system. Axial thicknesses of successive lens elements are designated $T_1$ to $T_3$. $T_4$ is 3mm and represents the axial thickness of an exciter filter when used. Successive axial spaces are designated $S_1$ to $S_7$. The successive lens radii are designated $R_1$ to $R_6$, where the minus sign (−) applies to surfaces whose center of curvature lies on the object side of their vertices. Refractive index and Abbe numbers are designated $ND_1$ to $ND_3$ and $\nu_1$ to $\nu_3$, respectively, and are absolute values. $x$ may vary from 23 to 29mm.

TABLE I

| Lens | Radius | Thickness | Space | Index of Refraction | Abbe Number |
|---|---|---|---|---|---|
| | | | $0.5x < S_0 < 1.2692x$ | | |
| I | $R_1 = 1.6461x$ | $T_1 = 0.23077x$ | | $1.52 < ND_1 < 1.53$ | $\nu_1 \approx 58$ |
| | $R_2 = ^* 0.4962x$ | | $S_1 = 1.7308x - S_0$ | | |
| | | | $S_2 = 5.3661x$ | | |
| II | $R_3 = -1.4511x$ | $T_2 = 0.15385x$ | | $1.51 < ND_2 < 1.52$ | $\nu_2 \approx 64$ |
| | $R_4 = 5.23x$ | | $S_3 = 0.7423x$ | | |
| III | $R_5 = 1.2608x$ | $T_3 = 0.11538x$ | | $1.61 < ND_3 < 1.62$ | $\nu_3 \approx 36$ |
| | $R_6 = 4.4165x$ | | $S_4 + T_4 + S_5 + S_6 = 4.8461x$ | | |

*Aspheric surface

The back surface of lens I with radius $R_2$, is an axially symmetrical aspheric surface with Z axis of revolution. The value of Z for any given value of $x$ and $y$, and is defined by the equation:

$$Z = cp^2/[1 + \sqrt{1 - (k+1)c^2p^2}] + dp^4 + ep^6 + fp^8 + gp^{10}$$

wherein:

$d = 0$ $e = 0$ $f = 0$ $g = 0$ $p^2 = x^2 + y^2$ $c = 1/R_2$ and $k = 1$

The mathematical support for this formula and explanation may be found in the Military Standard Handbook, MIL-HBDK-141 (5OCT62), Sec. 5.5.1, Page 5-13 to 5-21.

The specific values of a preferred embodiment can be determined from the following relationship.

TABLE II

| Lens | Radius | Thickness | Space | Index of Refraction | Abbe Number |
|---|---|---|---|---|---|
| | $R_1 = 42.8$ | | $13 < S_0 < 33$ | | |
| I | | $T_1 = 6.0$ | | $ND_1 = 1.523$ | $\nu_1 = 58.6$ |
| | $R_2^* = 12.90$ | | | | |
| | | | $S_1 = 45 - S_0$ | | |
| | | | $S_2 = 139.52$ | | |
| | $R_3 = -37.73$ | | | | |
| II | | $T_2 = 4.0$ | | $ND_2 = 1.517$ | $\nu_2 = 64.5$ |
| | $R_4 = 135.98$ | | | | |
| | | | $S_3 = 19.2$ | | |
| | $R_5 = 32.78$ | | | | |
| III | | $T_3 = 3.0$ | | $ND_3 = 1.617$ | $\nu_3 = 36.6$ |
| | $R_6 = 114.83$ | | | | |
| | | | $S_4 + T_4 + S_5 + S_6 = 126$ | | |

*Aspheric surface having conic and deformation coefficients given in Table I.

It will be apparent that the foregoing values are variable depending on the value of $x$. Other forms are thus possible and changes may be made in the values of the constructional data named without departing from the spirit of this invention.

The apparent excess precision implied by the large number of decimal places is somewhat fictitious for a number of reasons. For instance, varying radii (larger in particular) by several millimeters would produce only minimal changes, mostly in focal length. Variations in thicknesses of point 1 to point 2mm would not adversely affect performance. In fact, large regions of design exist (assuming that radii and thicknesses are properly balanced).

What is claimed is:

1. A vertical illuminator for imaging a light source at a microscope objective back aperture to illuminate an object under examination through the microscope objective in fluorescent microscopy which comprises, in sequence and optical alignment along an axis, a light source, an axially-moveable positive meniscus lens I having an aspheric convex surface, a positive biconvex lens II, a negative meniscus lens III and a beam splitter for introducing light from said source into a microscope observation system, whereby an object is illuminated through said observation system.

2. The vertical illuminator according to claim 1 wherein the parameters of lens radii, designated $R_1$ to $R_6$ wherein a minus sign (−) applies to radii having their vertices on the object side of the lens, lens thicknesses, designated $T_1$ to $T_3$, axial spaces, designated $S_0$ to $S_6$, indices of refraction, designated $ND_1$ to $ND_3$, and Abbe numbers, designated $\nu_1$ to $\nu_3$, have the following values

| Lens | Radius | Thickness | Space | Index of Refraction | Abbe Number |
|---|---|---|---|---|---|
| | $R_1 = 1.6461x$ | | $0.5x < S_0 < 1.2692x$ | | |
| I | | $T_1 = 0.23077x$ | | $1.52 < ND_1 < 1.53$ | $\nu_1 \cong 58$ |
| | $R_2 = 0.4962x$ | | | | |
| | | | $S_1 = 1.7308x - S_0$ | | |
| | | | $S_2 = 5.3661x$ | | |
| | $R_3 = -1.4511x$ | | | | |
| II | | $T_2 = 0.15385x$ | | $1.51 < ND_2 < 1.52$ | $\nu_2 \cong 64$ |
| | $R_4 = 5.23x$ | | | | |
| | | | $S_3 = -0.7423x$ | | |
| | $R_5 = 1.2608x$ | | | | |
| III | | $T_3 = 0.11538x$ | | $1.61 < ND_3 < 1.62$ | $\nu_3 \cong 36$ |
| | $R_6 = 4.4165x$ | | | | |
| | | | $S_4 + T_4 + S_5 + S_6 = 4.8461x$ | | | wherein $x$ is 23 to 29mm, and the surface of lens I having radius $R_2$ is an axially-symmetrical aspheric surface defined by the formula $Z = cp^2 / [1 + \sqrt{1-(k+1)c^2p^2}] + dp^4 + ep^6 + fp^8 + gp^{10}$ having a conic coefficient $k$ of $-1$ and deformation constants $d, e, f$ and $g$ of 0 and $c = 1/R_2$ and $p^2 = X^2 + Y^2$ where X and Y are of the off-axis co-ordinates of said surface.

3. The illumination system of claim 2 wherein $x$ is 26mm, $ND_1 = 1.523$, $ND_2 = 1.517$, $ND_3 = 1.617$, $\nu_1 = 58.6$, $\nu_2 = 64.5$ and $\nu_3 = 36.4$.

* * * * *